Patented May 2, 1933

1,906,894

UNITED STATES PATENT OFFICE

WERNER ZERWECK AND WILHELM HECHTENBERG, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

6-ARYLAMINO-2-HYDROXY-NAPHTHALENES AND PROCESS OF MAKING SAME

No Drawing. Application filed June 27, 1930, Serial No. 464,432, and in Germany July 24, 1929.

Our present invention relates to 6-arylamino-2-hydroxy-naphthalenes and to a process of making same.

These new compounds are valuable intermediates for the production of dyestuffs. They correspond to the general formula:

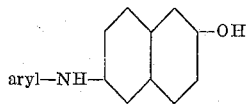

The process of manufacturing these compounds in accordance with this invention comprises heating 6-arylamino-naphthalene-2-sulfonic acids with molten caustic alkali. This operation may be carried out also at raised pressure.

The smooth course of this reaction, in spite of the high temperature necessary for splitting off the β-sulfonic group, is the more surprising since 6-amino-naphthalene-2-sulfonic acid does not yield 6-amino-2-naphthol in the presence of molten alkali and arylamino groups are known to be more easily attacked by molten alkali than amino groups.

In order to further illustrate our invention the following examples are given, the parts being by weight and all temperatures in centigrade degrees, but we wish it, however, to be understood that we are not limited to the particular products nor reaction conditions mentioned therein:—

Example 1

10 parts of 6-phenylamino-naphthalene-2-sulfonic acid (described in Journal f. prakt. Chemie (2), vol. 71, page 447) are introduced at about 280° into a molten mixture of 60 parts of caustic potash and 6 parts of water. Then the temperature is raised to 300° and maintained there for a short time. When cool the mass is dissolved in water and the formed 6-phenylamino-2-hydroxy-naphthalene precipitated by means of sulfuric acid. For purification it may be redissolved in caustic soda solution and bisulfite or recrystallized from mono-chloro-benzene. It corresponds to the formula:

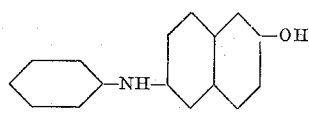

is easily soluble in dilute caustic alkali solutions and melts at 134°.

Example 2

124 parts of 6-para-tolylamino-naphthalene-2-sulfonic acid (prepared according to Zeitschrift f. Farben- u. Textilchemie 1904, page 59) are introduced at 245–255° during 10 minutes into a molten mixture of 250 parts of caustic potash and 25 parts of water. Then the temperature is raised during 5–10 minutes to 260° and maintained at 260–265° for 15 minutes. When cool the mass is dissolved in 2000 parts of water, filtered in the hot and precipitated when cold with sulfuric acid. The new 6-para-tolylamino-2-hydroxy-naphthalene thus obtained corresponds to the formula:

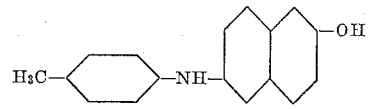

It represents, when recrystallized from mono-chloro-benzene, colorless crystals melting at 144°.

Example 3

198 parts of 6-phenylamino-naphthalene-2-sulfonic acid (of 90% strength) are introduced into a molten mass of 375 parts of caustic potash and 115 parts of water. Then the whole is heated in an autoclave to 265–270° for 3½–4 hours. When cool the mass is dissolved in about 4000 parts of water. From the filtered solution 6-phenylamino - 2 - hydroxy - naphthalene is precipitated by the addition of 435 parts of sulfuric acid of 66° Bé. The precipitate is filtered off, washed with water till neutral and dried. The product thus obtained in a good yield and purity is identical with the product of Example 1.

*Example 4*

28 parts of 6-phenylamino-naphthalene-2-sulfonic acid, 40 parts of caustic soda and 13 parts of water are heated together in an autoclave provided with a stirrer to 255–260° for about 5 hours. The mass is worked up according to Example 1. The product is identical to that of Example 1.

*Example 5*

20 parts of 6-β-naphthylamino-naphthalene-2-sulfonic acid (prepared according to Bucherer's reaction by boiling 2-hydroxy-naphthalene-6-sulfonic acid and β-naphthylamine with bisulfite) are introduced into 100 parts of caustic potash and 35 parts of water and the mixture is heated in an autoclave to 220° for 7–9 hours. The reaction product is isolated as described in the foregoing example. For purification it may be recrystallized from mono-chloro-benzene. The new 6-β-naphthylamino-2-hydroxy-naphthalene thus obtained corresponds to the formula:

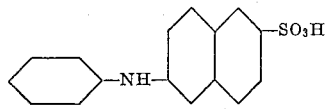

It melts at 168–170° and is nearly insoluble in a dilute caustic soda solution.

We claim:—

1. Process which comprises heating a 6-arylamino-naphthalene-2-sulfonic acid of the general formula:

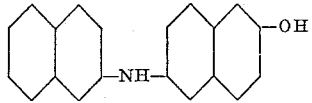

(Wherein R means an aryl radical of the benzene or naphthalene series) with molten caustic alkali.

2. Process which comprises heating 6-phenylamino-naphthalene-2-sulfonic acid of the formula:

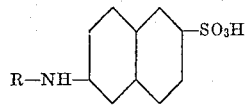

with a molten caustic alkali.

3. As new compounds the 6-arylamino-2-hydroxy-naphthalenes of the general formula:

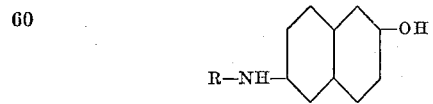

(Wherein R means an aryl radical of the benzene or naphthalene series) which compounds are colorless crystallized substances having a definite melting point.

4. As a new compound the 6-phenylamino-2-hydroxy-naphthalene of the formula:

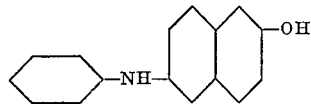

which compound is a colorless crystallized substance, melting when recrystallized from mono-chloro-benzene at 134°, easily soluble in a caustic alkali solution.

5. Process which comprises heating 6-para-tolylamino-naphthalene-2-sulfonic acid of the formula:

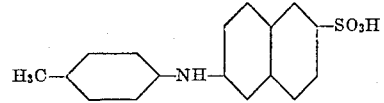

with a molten caustic alkali.

6. Process which comprises heating 6-β-naphthylamino-naphthalene-2-sulfonic acid of the formula:

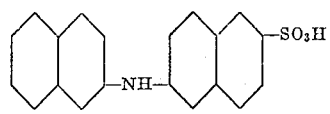

with a molten caustic alkali.

7. As a new compound the 6-para-tolylamino-2-hydroxy-naphthalene of the formula:

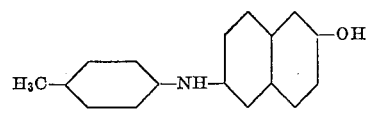

which compound is a colorless crystallized substance melting when recrystallized from mono-chloro-benzene at 144° C.

8. As a new compound the 6-β-naphthylamino-2-hydroxy-naphthalene of the formula:

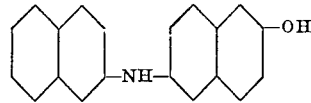

which compound melts at 168 to 170° C. and is nearly insoluble in a dilute caustic soda solution.

In testimony whereof, we affix our signatures.

WERNER ZERWECK.
WILHELM HECHTENBERG.